United States Patent
Bertolini et al.

(10) Patent No.: US 12,546,367 B2
(45) Date of Patent: Feb. 10, 2026

(54) BEARING UNIT WITH SEALING DEVICE

(71) Applicant: AKTIEBOLAGET SKF, Gothenburg (SE)

(72) Inventors: Andrea A. Bertolini, Carrara (IT); Alessio Nebbia Colomba, Pisa (IT); Fabio Cavacece, Rome (IT)

(73) Assignee: Aktiebolaget, SKF, Gothenburg (SE)

( * ) Notice: Subject to any disclaimer, the term of this patent is extended or adjusted under 35 U.S.C. 154(b) by 163 days.

(21) Appl. No.: 18/221,922

(22) Filed: Jul. 14, 2023

(65) Prior Publication Data
US 2024/0052889 A1  Feb. 15, 2024

(30) Foreign Application Priority Data
Aug. 10, 2022 (IT) .................. 102022000017073

(51) Int. Cl.
*F16C 33/80* (2006.01)
*F16C 33/78* (2006.01)

(52) U.S. Cl.
CPC ........ *F16C 33/805* (2013.01); *F16C 33/7823* (2013.01)

(58) Field of Classification Search
CPC .... F16C 33/805; F16C 33/7823; F16C 33/80; F16C 33/7866; F16C 33/7859; F16C 33/7816; F16C 33/7853; F16C 33/7863; F16C 33/7889; F16C 33/782; F16C 33/784; F16C 33/78; F16C 33/7843; F16J 15/3232; F16J 15/3236
See application file for complete search history.

(56) References Cited

U.S. PATENT DOCUMENTS

2019/0010989 A1 * 1/2019 Falaschi .............. F16C 33/7853

FOREIGN PATENT DOCUMENTS

| DE | 102009033350 | | 1/2011 | |
| DE | 102009033350 A1 * | | 1/2011 | .......... F16C 33/7896 |
| EP | 2995829 | | 3/2016 | |
| JP | H0225774 | | 2/1990 | |
| JP | 2007255637 | | 10/2007 | |
| JP | 2016017579 A * | | 2/2016 | .......... F16C 33/7879 |

OTHER PUBLICATIONS

International Search Report for corresponding Italy Patent Application No. 102022000017073 dated Feb. 24, 2023.

* cited by examiner

*Primary Examiner* — James Pilkington
*Assistant Examiner* — Aimee Tran Nguyen
(74) *Attorney, Agent, or Firm* — Stinson LLP

(57) ABSTRACT

A bearing unit includes an inner ring, an outer ring, and a sealing device interposed between the inner and outer ring. The sealing device includes first annular screen joined to the radially outer ring and a second annular screen joined to the radially inner ring and facing the first screen. The first screen includes a first gasket made of an elastomeric material, and the second screen includes a second sealing gasket made of an elastomeric material. The second gasket includes an elastically deformable non-contacting annular lip projecting from a radially outer peripheral edge of the second screen. The non-contacting annular sealing lip is contained at least partially within an annular groove of the outer ring in an un-deformed configuration, and the non-contacting annular lip is configured to flex in a radially and axially inward direction and contact the annular groove in a deformed configuration.

19 Claims, 2 Drawing Sheets

BEARING UNIT WITH SEALING DEVICE

CROSS REFERENCE TO RELATED APPLICATIONS

This application is based on and claims priority to Italian Patent Application No. 102022000017073 filed on Aug. 10, 2022 under 35 U.S.C. § 119, the disclosure of which is incorporated herein by reference in its entirety.

FIELD

The present disclosure relates to a sealing device for a bearing unit.

BRIEF DESCRIPTION OF THE DRAWINGS

The present disclosure is described below with reference to the attached drawings, which show non-limiting exemplary embodiments thereof, in which.

DETAILED DESCRIPTION

Figure 1:
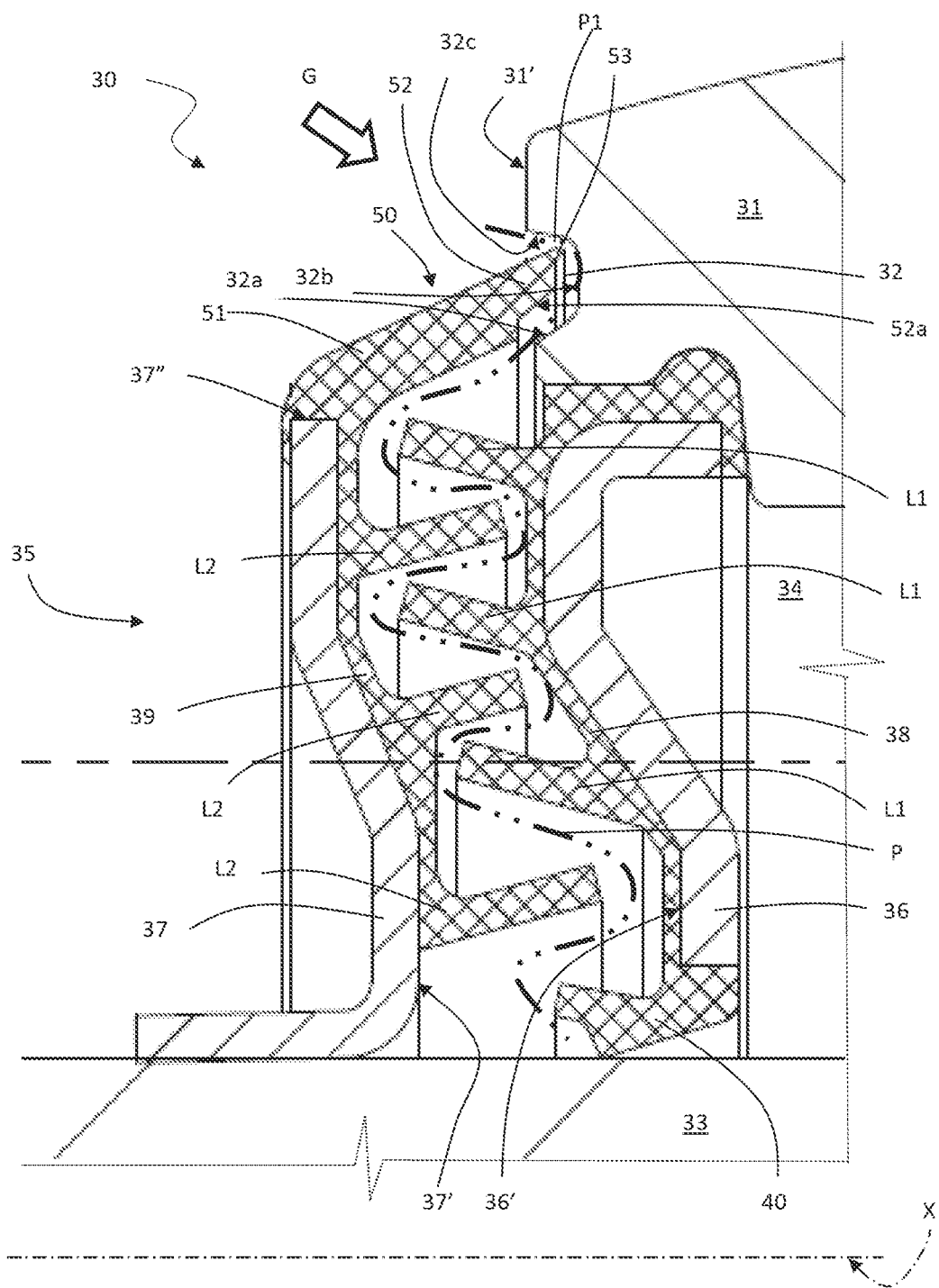
FIG. 1 is a radial cross section view of a bearing unit according to exemplary embodiments of the present disclosure.

Bearing units with rolling elements are washed frequently for reasons of hygiene. This can include as frequent as daily washing, as well as a very intensive weekly wash, using jets of pressurized liquid detergent and disinfectant.

These frequent washes using liquid detergents, often with low surface tensions, can cause premature wear on sealing lips of a sealing device of the bearing unit, and subsequently of the bearing unit itself, because such liquid detergents, when mixed with water for washing, tend to seep into lubricant present in the bearing unit. This seeping can cause the lubricant to degrade and prevent the lubricant from lubricating points of contact between rolling elements of the bearing unit and raceways of the rings. Known solutions utilize gaskets with high-interference contact lips. However, this increases friction between the sealing device and elements of the bearing unit, such as the inner ring and the outer ring, resulting in higher energy consumption during use and increased wear on these high-interference contact lips, all without a significant improvement in sealing action.

Labyrinth sealing devices have also been made, in particular "gutter" sealing devices, in which a first gasket provided with a first plurality of non-contacting lips and a second gasket provided with a second plurality of non-contacting lips are arranged to face one another and alternate to create a tortuous path into an interior of the dealing device. While these reduce friction caused by contact between the lips and the bearing unit, and there reduce wear on the lips and bearing unit, the lack of contacting surfaces results in a greater risk of ingress of water, detergent, and other impurities into the tortuous path and therefore into the bearing unit.

Thus, an objective of the present disclosure is to provide a bearing unit fitted with a sealing device to safeguard the functionality of the bearing unit by preventing external liquid contaminants from entering the bearing unit without simultaneously increasing friction between the sealing device and the bearing unit.

By way of non-limiting example, a roller bearing unit 30 may include a radially outer ring 31, a radially inner ring 33, and a sealing device 35 interposed between radially outer ring 31 and radially inner ring 33. In some embodiments, an annular end edge 31' of radially outer ring 31 may be provided with an annular groove 32.

In some embodiments, sealing device 35 may include a first annular screen 36 that may be joined to radially outer ring 31 when in use, and a second annular screen 37 that may be arranged opposite first screen 36 and may be joined to radially inner ring 33 when in use. In some embodiments, first annular screen 36 and second annular screen 37 may be made of sheet metal.

In some embodiments, sealing device 35 may further include a first gasket 38 and a second gasket 39. In some embodiments, first gasket 38 may be integral with a first face 36' of first screen 36 that faces second screen 37 and is on an opposite axial side of an inner annular chamber 34 of bearing unit 30 defined between outer ring 31 and inner ring 33. In some embodiments, second gasket 39 may be integral with a face 37' of second screen 37 that faces first face 36' of first screen 36. Both first gasket 38 and second gasket 39 may be made of an elastomer.

In some embodiments, first gasket 38 may be provided with at least one sliding annular sealing lip 40 that may contact a radially outer surface of radially inner ring 33 when in use. In some embodiments, second gasket 39 may be provided with at least one non-contacting annular sealing lip 50 that may project toward outer ring 31. In some embodiments, first screen 36, second screen 37, first gasket 38, and second gasket 39 may be coaxial with bearing unit 30. In this way, sealing device 35 may have an axis of symmetry that coincides with axis of symmetry X of bearing unit 30 when in use.

In some embodiments, first gasket 38 and second gasket 39 may be provided with a first plurality and a second plurality of non-contacting annular sealing lips L1 and L2, respectively. Annular sealing lips L1 and L2 (e.g., second and third non-contacting annular sealing lips relative to the first non-contacting annular sealing lip (50)) may be arranged obliquely with respect to axis X of bearing unit 30 moving radially away from axis X and alternating radially with one another. Annular sealing lips L1 and L2 may further overlap with one another axially to create a tortuous path P from first non-contacting annular sealing lip 50 to at least one sliding annular sealing lip 40 that may impede ingress of washing liquids or other impurities into bearing unit 30 while also facilitating drainage of any washing liquids or other impurities that have previously entered tortuous path P.

Figure 2:
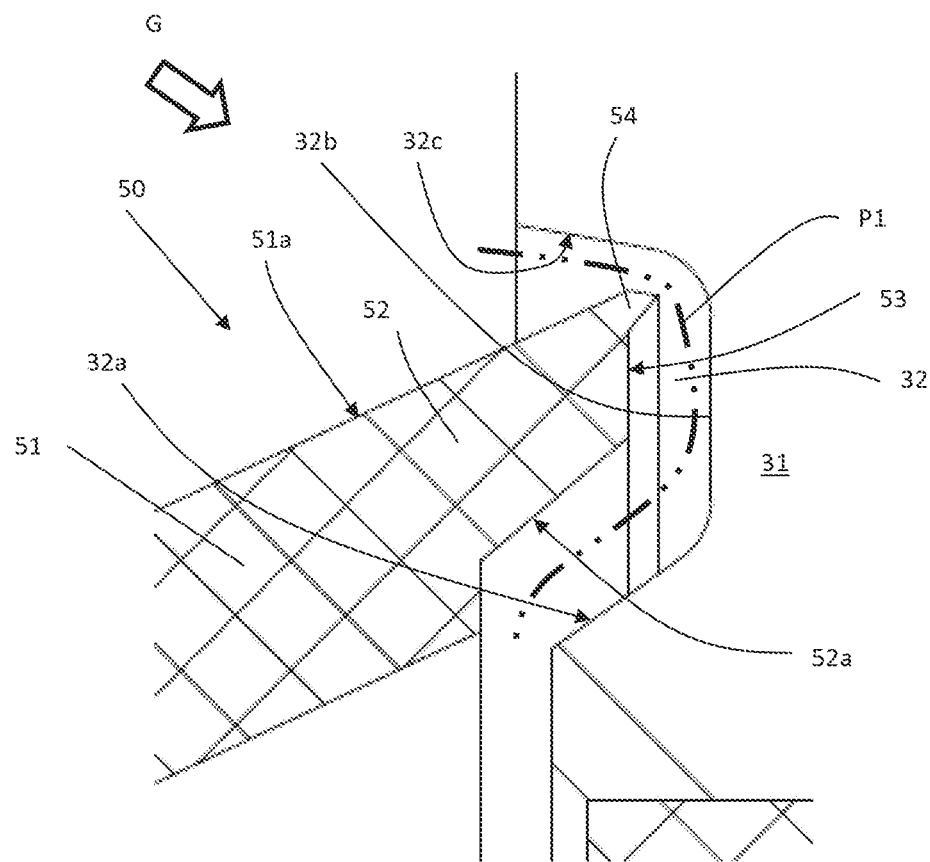
FIG. 2 is an enlarged view of a detail from FIG. 1 according to exemplary embodiments of the present disclosure.

In some embodiments, as illustrated in more detail in FIG. 2, first non-contacting annular sealing lip 50 may project from a radially outer peripheral edge 37" of second screen 37 and may cooperate with annular groove 32 of radially outer ring 31 when in use. Annular sealing lip 50 may be free of a rigid frame, e.g., free from the metal sheet that forms second screen 37, and may therefore be elastically deformable. In this way, annular sealing lip 50 may flex in a radially inward direction toward first screen 36 and against a lower surface of annular groove 32 when subject to eternal force directed toward bearing unit 30. In some embodiments, a jet of liquid G, shown in FIGS. 1 and 2, directed toward bearing unit 30 may cause annular sealing lip 50 to flex inward toward first screen 36 and against annular groove 32. In some embodiments, G may be a pressurized jet for of washing liquid, which may further include a surfactant detergent.

In some embodiments, first non-contacting annular sealing lip 50 may have a frustoconical, toroidal shape projecting axially and radially from the peripheral edge 37", tapering progressively in the direction towards annular groove 32.

In some embodiments, annular lip 50 may include an elastically deformable first portion 51 projecting obliquely from peripheral edge 37" of second screen 37, and a second portion 52 tapered toward a free end 53 of sealing lip 50. In some embodiments, first portion 51 may include a radially outer frustoconical surface 51a. In some embodiments, second portion 52 may include a spur 54 at a distal end of annular lip 50, e.g., free end 53, that may be contained substantially within annular groove 32 but that may make no contact with a surface of annular groove 32 when annular lip 50 is not deformed (i.e., in an un-deformed configuration). In some embodiments, second portion 52 may further include a radially inner frustoconical surface 52a.

In some embodiments, first non-contacting annular lip 50, and therefore first portion 51 and second portion 52, may be arranged obliquely in relation to the axis of symmetry of sealing device 35 (which may coincide with axis X of bearing unit 30). In this way, annular lip 50 may be arranged obliquely in the direction away from axis X of bearing unit 30.

In some embodiments, annular groove 32 may be defined by a first radially inner frustoconical surface 32a, an annular surface 32b radially outside first frustoconical surface 32a, and a second frustoconical surface 32c arranged radially and axially outside annular surface 32b.

When in use and not deformed, spur 54 of second portion 52 of first non-contacting annular lip 50 and annular groove 32 may define an additional labyrinth seal, which may form an initial section P1 of tortuous path P. This labyrinth seal forming initial section P1 may further impede ingress of washing liquids and other impurities into bearing unit 30. In some embodiments, frustoconical surface 32c and annular surface 32b of annular groove 32 may form the labyrinth seal of initial section P1 with spur 54 of annular lip 50.

In some embodiments, when bearing unit 30 is under external force, e.g., from a thrust of water and liquid detergents forming jet G, annular lip 50 may flex inward such that second portion 52 comes into contact with annular groove 32. In some embodiments, annular lip 50, and in particular first and second portions 51 and 52, may flex inward due to external forces such that a frustoconical surface 52a of second portion 52 may come into contact with first frustoconical surface 32a of annular groove 32. This creates a complete, contacting seal to prevent ingress of washing water and other impurities into an interior of sealing device 35 and bearing unit 30, where the strength of the seal is directly proportional to the amount of external force due to jet G. In some embodiments, spur 54 may also come into contact with annular surface 32b of annular groove 32 due to the external forces, such as jet G, improving the complete seal formed between annular groove 32 and annular lip 50.

Because first non-contacting annular lip 50 may be elastically deformable, frustoconical surface 52a and frustoconical surface 32a may align with each other when force from jet G is applied to annular lip 50, even if frustoconical surface 52a and frustoconical surface 32a are inclined relative to axis X at different angles when annular lip 50 is not deformed. In this way, the seal formed between surface 52a and surface 32a may be a complete seal and not simply a labyrinth seal, like that which is formed as P1 when annular lip 50 is not deformed.

First non-contacting annular lip 50 may be made entirely of an elastomeric material to provide the elastic flexing required to ensure a complete seal is created between annular groove 32 and annular lip 50 when external force from jet G is applied to annular lip 50. Indeed, a metal support within annular lip 50 would make said lip too rigid, and therefore unsuitable for purposes of the present disclosure.

When force exerted by jet G has ceased, first non-contacting annular lip 50 may return to the un-deformed position, in which sealing device 35 continues working as a labyrinth seal impeding the ingress of external contaminants by means of tortuous path P, which includes initial section P1 formed between spur 54 and surfaces 32b and 32c of annular groove 32.

Figure 3:
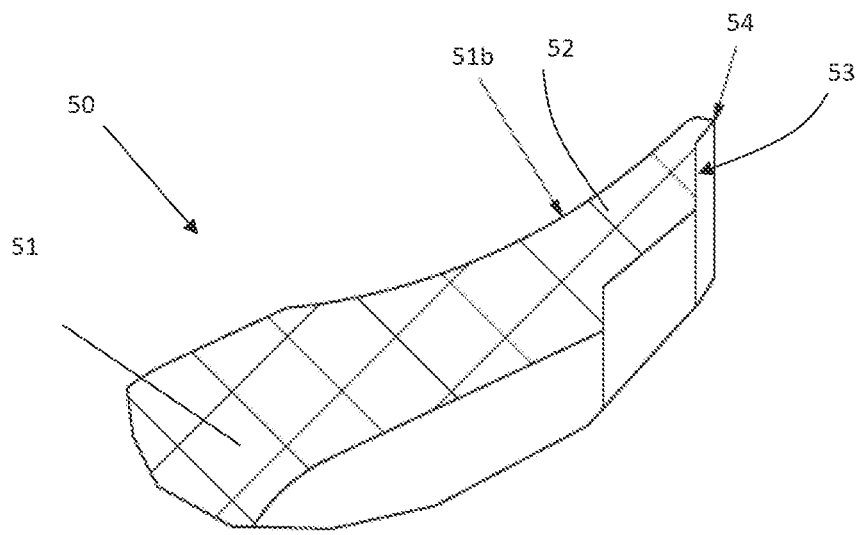
FIG. 3 is an enlarged view of a detail from FIG. 1 according to exemplary embodiments of the present disclosure.

In some embodiments, first portion 51 of annular lip 50 may not include a frustoconical surface 51a and instead may include an outer surface 51b curved inward with a concavity facing radially outwards (see, e.g., FIG. 3). Concave surface 51b amplifies the elastic deformation of annular lip 50 caused by external forces from jet G. In this way, the complete seal formed between frustoconical surface 52a of second portion 52 of annular lip 50 and first frustoconical surface 32a of annular groove 32 may be achieved under forces lower than when annular lip includes a frustoconical outer surface 51a.

To ensure sufficient strength to withstand the external forces from jet G while at the same time ensuring sufficient flexibility to deform and seal off the interior of sealing device 35 under the external forces from jet G, a thickness of second portion 52 of first non-contacting annular lip 50 that tapers toward free end 53 may be between 0.6 mm and 0.8 mm.

In some embodiments, to correctly match the geometry of annular groove 32, an overall length of first non-contacting annular lip 50 may be between 2.8 mm and 3.0 mm. Values below 2.8 mm would not guarantee formation of a proper labyrinth seal between spur 54 and second frustoconical surface 32c and annular surface 32b of annular groove 32. Values greater than 3.0 mm would bring spur 54 into contact with the annular surface 32b of annular groove 32 when first non-contacting annular lip 50 is not deformed, thus increasing frictional losses of bearing unit 30.

In some embodiments, an axial depth of annular groove 32, i.e., an axial distance between an annular end edge 31' of radially outer ring 31 and annular surface 32b of annular groove 32b, may be between 0.55 mm and 0.65 mm. Coupled with the length of first non-contacting annular lip 50, an average thickness of initial section P1 of tortuous path P may be approximately 0.15 mm.

In some embodiments, first frustoconical surface 32a may be inclined with respect to axis X of symmetry of between 33° and 37°. The axial symmetry of sealing device 35 causes any liquid that has penetrated into the interior of sealing device 35 to move towards lower portions of the sealing device due to the effects of gravity. The inclination of first frustoconical surface 32a therefore helps to drain any liquid that penetrates inside sealing device 35 by providing a path to exit sealing device 35.

In some embodiments, second frustoconical surface 32c may also be included with respect to the axis of symmetry X in order to allow any liquid that has accumulated in annular groove 32 to drain from sealing device 35 and out to the external environment of bearing unit 30. To facilitate this draining, second frustoconical surface 32c may be included with respect to axis X at an angle of at least 10° and at most 15°. Indeed, if the angle of inclination were less than 10°, there is an increased risk of liquid remaining inside annular groove, while angles of inclination greater than 15° permit ingress of more liquid into annular groove 32 rather than draining any liquid that may be inside annular groove 32.

There are numerous other variants in addition to the embodiment of the disclosure described above. Furthermore, said embodiments are merely examples that limit neither the scope nor the disclosure nor the possible arrangements of the disclosure. Indeed, although the above description enables the person skilled in the art to carry out the present disclosure according to at least one example embodiment thereof, many variants of the described components can also be used without thereby departing from the scope of the disclosure as defined in the attached claims, which should be understood literally and/or according to the legal equivalents thereof.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this disclosure, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

We claim:

1. A bearing unit comprising:
a radially outer ring comprising:
   an axial annular end edge forming an axial end of the outer ring; and
   an annular groove formed in the axial annular end edge, the annular groove comprising:
      a first radially inner frustoconical surface;
      an annular surface radially outside the first frustoconical surface; and
      a second frustoconical surface arranged radially and axially outside the annular surface;
a radially inner ring; and
a sealing device interposed between the radially outer ring and the radially inner ring, the sealing device comprising:
   an annular screen joined to the radially inner ring; and
   a sealing gasket made of an elastomeric material, the sealing gasket being supported by the annular screen, the sealing gasket comprising:
      at least one elastically deformable first non-contacting annular lip projecting from a radially outer peripheral edge of the annular screen;
wherein the first non-contacting annular lip is contained at least partially within the annular groove of the radially outer ring in an un-deformed configuration, and
the first non-contacting annular lip is configured to flex in a radially and axially inward direction in the annular groove of the radially outer ring and contact the annular groove in a deformed configuration.

2. The bearing unit of claim 1, wherein the annular screen is a second annular screen and the sealing gasket is a second sealing gasket, the sealing device further comprising:
a first annular screen joined to the radially outer ring; and
a first sealing gasket supported by the first annular screen and comprising an elastomeric material;
wherein the second annular screen faces the first annular screen; and
wherein the first sealing gasket and the second sealing gasket define a tortuous path therebetween.

3. The bearing unit of claim 2, wherein:
the first sealing gasket further comprises a plurality of second non-contacting lips radially inner with respect to the first non-contacting lip of the second gasket,
the second gasket further comprises a plurality of third non-contacting lips radially inner relative to the first non-contacting lip, and
the plurality of second non-contacting lips and the plurality of third non-contacting lips together define the tortuous path.

4. The bearing unit of claim 2, wherein the first sealing gasket further comprises a first contacting lip at an inner radial end of the first sealing gasket and forming a contacting seal with a radially outer surface of the inner ring.

5. The bearing unit of claim 1, wherein the first non-contacting annular lip and the groove define between them a labyrinth seal.

6. A bearing unit comprising:
a radially outer ring comprising:
an axial annular end edge; and
an annular groove formed in the axial annular end edge;
a radially inner ring; and
a sealing device interposed between the radially outer ring and the radially inner ring, the sealing device comprising:
a first annular screen joined to the radially outer ring;
a first sealing gasket supported by the first annular screen and comprising an elastomeric material;
a second annular screen joined to the radially inner ring and facing the first annular screen; and
a second sealing gasket made of an elastomeric material, the second sealing gasket being supported by the second annular screen, the second sealing gasket comprising:
at least one elastically deformable first non-contacting annular lip projecting from a radially outer peripheral edge of the second annular screen, the first non-contacting annular lip comprising:
a first portion elastically flexible and projecting obliquely from the radially outer peripheral edge of the second annular screen with respect to an axis of symmetry of the bearing unit;
a second portion tapered toward a free end of the first non-contacting annular lip distal to the first portion, the second portion comprising a radially inner frustoconical surface; and
a spur integral with the second portion at the free end;
wherein the first sealing gasket and the second sealing gasket define a tortuous path therebetween, the first non-contacting annular lip being contained at least partially within the annular groove of the radially outer ring in an un-deformed configuration; and
the first non-contacting annular lip is configured to flex in a radially and axially inward direction in the annular groove of the radially outer ring and contact the annular groove in a deformed configuration.

7. The bearing unit of claim 6, wherein the annular groove further comprises:
a first radially inner frustoconical surface;
an annular surface radially outside the first frustoconical surface; and
a second frustoconical surface arranged radially and axially outside the annular surface;
wherein the spur and a substantial portion of the second portion of the first non-contacting annular lip are contained within the annular groove.

8. The bearing unit of claim 7, wherein the spur, the second frustoconical surface of the annular groove, and the annular surface of the groove define between them a labyrinth seal forming an initial section of the tortuous path.

9. The bearing unit of claim 7, wherein the frustoconical surface of the second portion is configured to contact the first frustoconical surface of the annular groove and form a contacting seal therewith when the first non-contacting annular lip is in the deformed configuration.

10. The bearing unit of claim 9, wherein the spur is configured to be in contact with the annular surface of the annular groove and form a contacting seal therewith when the first non-contacting annular lip is in a deformed configuration.

11. The bearing unit of claim 7, wherein:
the first sealing gasket further comprises a plurality of second non-contacting lips radially inner with respect to the first non-contacting lip of the second gasket,
the second gasket further comprises a plurality of third non-contacting lips radially inner relative to the first non-contacting lip, and
the plurality of second non-contacting lips and the plurality of third non-contacting lips together define the tortuous path.

12. The bearing unit of claim 11, wherein the first sealing gasket further comprises a first contacting lip at an inner radial end of the first sealing gasket and forming a contacting seal with a radially outer surface of the inner ring.

13. The bearing unit of claim 7, wherein the first frustoconical surface is inclined by between 33° and 37° with respect to the axis of symmetry of the bearing unit.

14. The bearing unit of claim 7, wherein the second frustoconical surface is inclined by between 10° and 15° with respect to the axis of symmetry of the bearing unit.

15. The bearing unit of claim 6, wherein the first portion of the first non-contacting annular lip comprises a radially outer frustoconical surface.

16. The bearing unit of claim 6, wherein the first portion of the first non-contacting annular lip comprises a radially outer concave surface.

17. A sealing device comprising:
a first annular screen;
a first sealing gasket made of an elastomeric material and comprising a plurality of first non-contacting lips, the first sealing gasket being supported by the first annular screen;
a second annular screen facing the first annular screen; and
a second sealing gasket made of an elastomeric material, the second sealing gasket being supported by the second annular screen, the second sealing gasket comprising:
a plurality of second non-contacting lips; and
at least one elastically deformable third non-contacting annular lip projecting from a radially outer peripheral edge of the second annular screen, the elastically deformable third non-contacting annular lip comprising:
a first portion elastically flexible and projecting from the radially outer peripheral edge of the second annular screen;
a second portion tapered toward a free end of the first non-contacting annular lip distal to the first portion, the second portion comprising a radially inner frustoconical surface; and
a spur integral with the second portion at the free end;
wherein the at least one third non-contacting annular lip is configured to elastically deform and form a contacting seal with an annular groove of an outer ring of a bearing unit.

18. The sealing device of claim 17, wherein the first portion of the third non-contacting annular lip comprises a radially outer frustoconical surface.

19. The sealing device of claim 17, wherein the first portion of the third non-contacting annular lip comprises a radially outer concave surface.

* * * * *